April 22, 1924.
A. C. PRATT
1,491,626
METHOD OF MAKING BEAD CABLES FOR TIRES
Original Filed Jan. 4, 1921
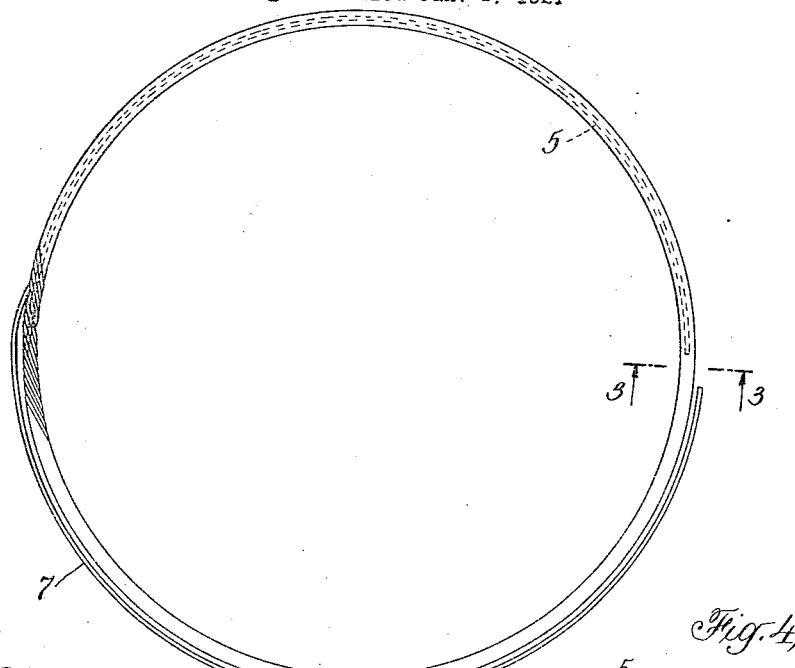
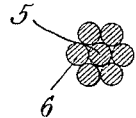
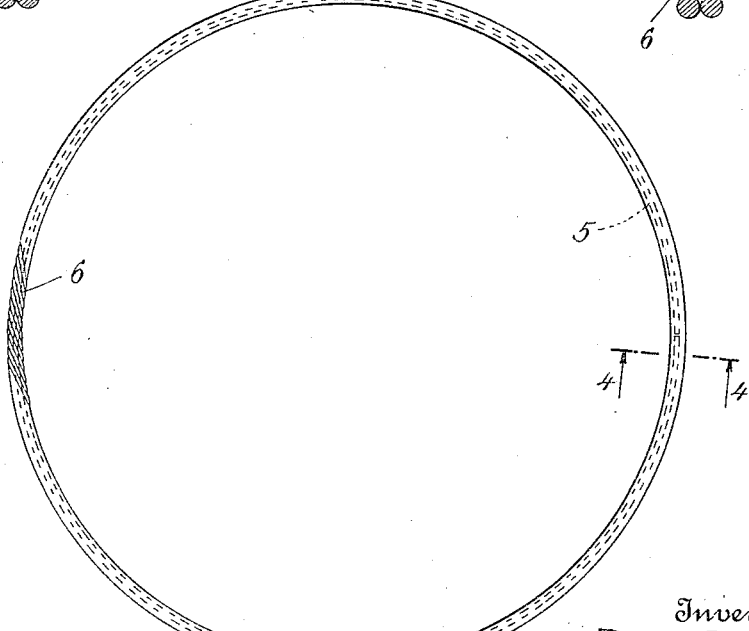
Inventor
A. C. Pratt,
Attorneys Patented Apr. 22, 1924.

1,491,626

UNITED STATES PATENT OFFICE.

ALPHONSO COMSTOCK PRATT, OF DEEP RIVER, CONNECTICUT, ASSIGNOR, BY MESNE ASSIGNMENTS, TO AMERICAN CHAIN COMPANY, INC., A CORPORATION OF NEW YORK.

METHOD OF MAKING BEAD CABLES FOR TIRES.

Application filed January 4, 1921, Serial No. 434,959. Renewed September 11, 1923.

*To all whom it may concern:*

Be it known that I, ALPHONSO COMSTOCK PRATT, a citizen of the United States, residing at Deep River, in the county of Middlesex, State of Connecticut, have invented certain new and useful Improvements in Methods of Making Bead Cables for Tires; and I do hereby declare the following to be a full, clear, and exact description of the invention, such as will enable others skilled in the art to which it appertains to make and use the same.

This invention relates to bead cables of the character employed in the beads of automobile tires, particularly tires of the so-called "straight side" type. The invention involves the provision of a novel method of making bead cables for this purpose. The invention is of special utility in the manufacture of bead cables of the type consisting of a core and a plurality of convolutions wound spirally about this core, the entire cable being formed from a single piece of wire whose end portions constitute the core of the cable and whose intermediate portion is wound spirally to form the plurality of convolutions of spirals. A bead cable of the type referred to is illustrated and described in Patent No. 1,294,160 granted to me February 11, 1919, which patent also describes a method and apparatus which may be employed in making such bead cables.

In making such a bead cable, the core for substantially half of the cable is first formed and then the wire is given a spiral configuration and is applied to the cable convolution after convolution until the cable has been completed with respect to one-half of the core and all of the overlying convolutions of spirals. Thereafter, a length of straight wire is run off sufficient to form the remainder of the core of the cable and the cable in this condition is taken from the machine. In a subsequent operation, this length of straight wire is inserted in the interior of the cable to fill the space provided for its reception and completing the core of the cable.

Cables of this character for use in the manufacture of automobile tires must be made with great accuracy with respect to their size. They are placed on the form or in the mold for a tire, the fabric of the tire is folded over them and the beads of the tire are built up upon them, and in the completed tire the bead cables must be in a definite location within the beads. This requires that the bead cables be of an exact and uniform diameter. In order to attain the exactness and uniformity of diameter which is so absolutely necessary, it has been the practice to place a completely formed bead cable upon an expanding machine and subject it to pressure sufficient to expand it from whatever was its diameter after completion of the operation of manufacture, to the fixed diameter required for the bead cables used in a tire.

I employ this method of accurately sizing the bead cables for use in tires by subjecting them to pressure upon an expanding machine. I have discovered, however, that when utilizing this expedient for sizing cables manufactured in accordance with the method above outlined in which the core of a cable is completed after its casing has been completed, far more favorable results can be obtained by proceeding in a prescribed manner which involves placing each bead cable upon the expanding machine twice, once before and once after completing the core of the cable.

When a partially completed bead cable is in the form which it has at the time of being taken from from a machine of the type disclosed in the patent above referred to, substantially one-half of the cable is in the form of a casing of convolutions of spirals with a central space within the casing. Because of this condition of substantially one-half of the cable, it is possible to expand the cable upon an expanding machine to a substantial extent without subjecting the cable to an excessive strain involving any danger of bursting it. On the other hand, after the core has been completed by snapping the end of straight wire into the interior of this portion of the cable which has a space within its casing, the application of an expanding pressure to a degree sufficient to effect a substantial expansion of the cable is quite apt to burst it.

Excellent results can be obtained and the danger of bursting cables in the process of sizing them can be practically eliminated by placing each cable upon the expanding machine before its core has been completed and expanding it to an amount approximating the diameter desired for the completed cable, then completing the core of the cable, and then expanding the completed cable further until the exact diameter desired for it has been reached.

These operations will be better understood by reference to the following description in connection with the accompanying drawings, in which Fig. 1 is a view illustrating a bead cable as it exists prior to the completion of its core, Fig. 2 is a similar view illustrating the completed cable, Fig. 3 is a transverse section on line 3—3 of Fig. 1, and Fig. 4 is a similar section on line 4—4 of Fig. 2.

The bead cable illustrated is made from a single continuous piece of wire whose ends together form the core of the cable and whose intermediate portion forms a casing about this core consisting of a plurality of convolutions of spirals with the spirals of the several convolutions lying side by side. Such a bead cable is preferably manufactured in accordance with the method and by the use of apparatus of the character described in the patent above referred to.

In Fig. 2 the core of the cable is indicated at 5 and the casing at 6. The ends of the piece of wire from which the cable is formed abut as shown at the right of Fig. 2. At a point substantially opposite these ends the wire from which the core is formed, passes out to the exterior of the cable and is spiraled to form the casing 6. Preferably the casing consists of six convolutions of spirals with the spirals lying side by side and disposed in the manner indicated in Figs. 3 and 4.

In the manufacture of such a bead cable, the end portion of a piece of wire is bent to a semicircle to form half of the core of the completed cable as is indicated at 5 in Figs. 1 and 4. From the end of this half of the core the wire is spiraled and six convolutions of spirals are applied in position to build up the cable. At the end of the operation of applying these six convolutions of spirals, the cable is complete except that half of it has no core. Throughout this half the partially completed cable is in the condition illustrated in Fig. 3. Then a length of straight wire is run off sufficient to form the remainder of the core. Fig. 1 illustrates the cable in this condition, the length of wire for the remainder of the core being shown at 7. This length of wire must be forced into the space within the interior of the cable. This can be readily done by pressing the wire 7 into the space between two convolutions of spirals from point to point throughout the length of the portion of the cable which is not provided with a core. This operation of inserting the core wire is termed "tucking" or "locking," the significance of the word "locking" being that the cable can be readily expanded before the core wire is inserted, whereas after its insertion expanding is far more difficult.

In accordance with the method constituting this invention, the partially completed cable in the form illustrated in Fig. 1 is placed upon an expanding machine and expanded to a diameter which approximates the diameter required for the completed cable. After this expanding operation, the core wire 7 is "tucked" so as to lock the cable and the manufacture of the cable is then completed. Then the completed cable is placed upon the expanding machine again and subjected to pressure to expand it a relatively small amount and thereby bring it to the exact size required.

An an example of conditions which are met in practice, it may be that cables are required of a diameter of 25.5 inches. A machine of the type above referred to may be made to operate so accurately and uniformly as to produce bead cables of diameters varying between 25.3 inches and 25.4 inches. If all of these cables were placed upon an expanding machine and expanded while in their completed form up to the desired diameter of 25.5 inches, there would be considerable breakage of cables, the breakage occurring among the cables produced at a diameter of about 25.3 inches which, therefore, required the maximum expansion. The loss due to breakage of cables may be considerably reduced by not expanding them the full amount after completion of their construction. Instead, when the cables are in the condition shown in Fig. 1, that is, before they are locked, and while there is no core throughout a portion of the cable, they are placed upon an expanding machine and expanded to a diameter approximating the desired diameter; in the instance cited they could all be expanded to a diameter of 25.4 inches. This may be readily done as the cables may be easily expanded before being locked. After this expanding operation, the cables are locked by tucking the core wire into the space within the casing of spirals. Then each cable is placed upon the expanding machine again and subjected to pressure sufficient to expand it the relatively small amount from 25.4 inches up to 25.5 inches. The expansion of the cables this relatively small amount involves but a small element of danger of breakage of the cables. This process of manufacture, therefore, results in a considerably larger number of accurately sized cables. In other words, the losses incident to the process of manufacture and therefore the cost of manufacturing, are substantially reduced.

I claim:

1. The method of making bead cables for automobile tires, which consists in making the cables in a partially completed state in which each cable includes a plurality of convolutions of spirally formed wire, then expanding the partially completed cables to compensate for variations in manufacture, then completing the cables, and then expanding them to size them accurately.

2. The method of making bead cables for automobile tires, which consists in making partially completed bead cables having cores throughout portions thereof and no cores throughout other portions, then expanding the partially completed cables, then completing the cores of the cables, and then expanding the completed cables to size them accurately.

3. The method of making bead cables for automobile tires, which consists in making partially completed cables having casings consisting of convolutions of spirals and having cores within portions only of the casings, then expanding the partially completed cables, then completing the cables by completing the cores thereof, and then expanding the cables to accurately size them.

4. The method of making bead cables for automobile tires, which consists in making partially completed cables from single and continuous pieces of wire by forming a portion of the core of the cable from one end of the piece of wire, forming a casing consisting of a plurality of convolutions of spirals enclosing this core and providing a length of wire at the opposite end of the piece projecting from the partially completed cable and adapted to form the remainder of the core, then expanding these partially completed cables, then completing the cables by inserting the projecting end of the wire of each cable into the space within the casing of that cable, and then expanding the completed cables to accurately size them.

In testimony whereof I affix my signature.

ALPHONSO COMSTOCK PRATT.